United States Patent [19]
Arackellian

[11] Patent Number: 5,616,909
[45] Date of Patent: Apr. 1, 1997

[54] METHOD AND APPARATUS FOR MAINTAINING A SCANNING OPTICAL PATH LENGTH WITHIN A PREDETERMINED RANGE

[75] Inventor: Kevork G. Arackellian, Everett, Wash.

[73] Assignee: Intermec Corporation, Everett, Wash.

[21] Appl. No.: 469,478

[22] Filed: Jun. 6, 1995

[51] Int. Cl.⁶ .................................................. G06K 7/10
[52] U.S. Cl. ........................................ 235/472; 235/470
[58] Field of Search .................................... 235/472, 467, 235/470

[56] References Cited

U.S. PATENT DOCUMENTS

| | | | |
|---|---|---|---|
| 4,808,804 | 2/1989 | Krichever et al. | 235/462 |
| 5,166,820 | 11/1992 | Fujita | 235/467 |
| 5,198,648 | 3/1993 | Hibbard | 235/462 |
| 5,258,605 | 11/1993 | Metlitsky et al. | 235/470 |
| 5,308,966 | 5/1994 | Danielson et al. | 235/472 |
| 5,485,263 | 1/1996 | Bjorner et al. | 356/4.01 |

Primary Examiner—Harold Pitts
Attorney, Agent, or Firm—Seed and Berry LLP

[57] ABSTRACT

A method and apparatus for maintaining a constant optical path length when scanning objects at different distances. The apparatus has a reading device that reads data carrying symbology on an object being scanned, and an optical system having a plurality of optical paths between the object being scanned and the reading device, where each of the plurality of optical paths has a different path length. The apparatus also has a size detector that determines a dimension of the size of the object being scanned and outputs a signal based on the dimension, and a selecting device that selects one of the plurality of optical paths of the optical system based on the signal output by the size detector to maintain an optical path length between the object being scanned and the reading device within a predetermined range.

29 Claims, 6 Drawing Sheets

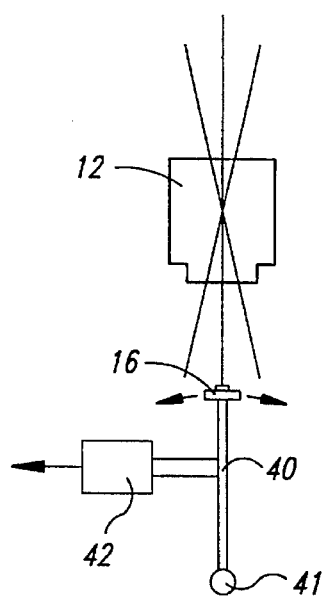
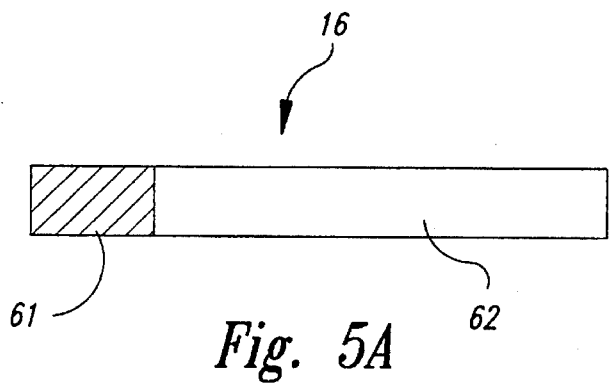
Fig. 5A
Fig. 5B
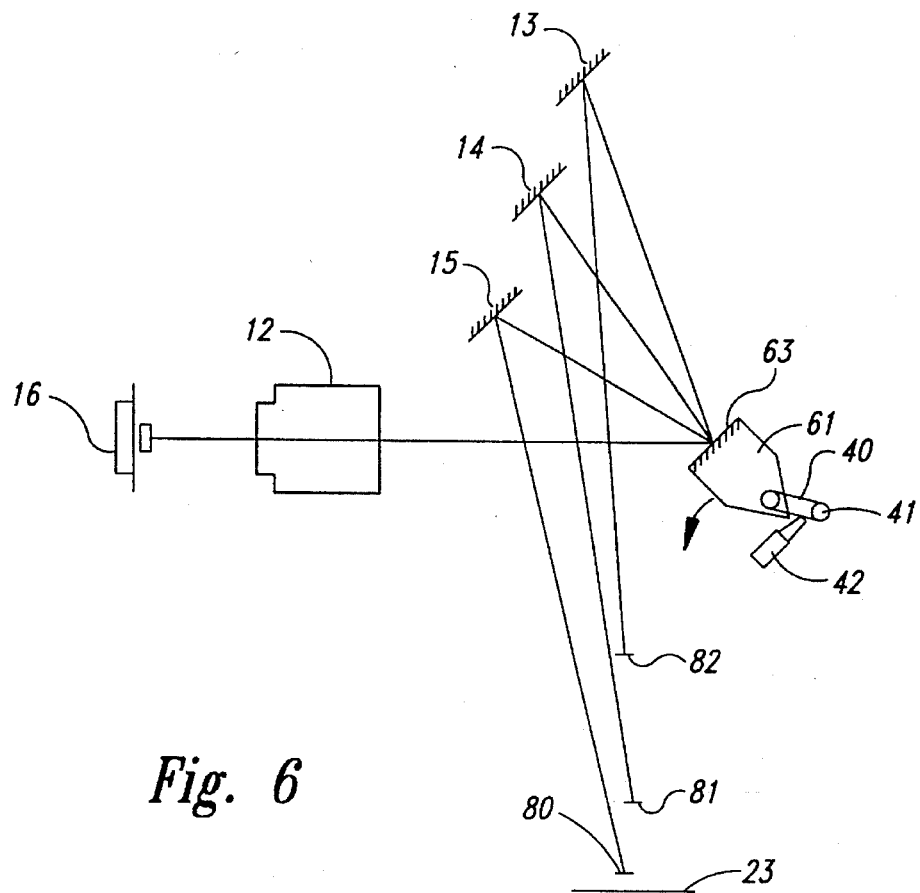
Fig. 6

METHOD AND APPARATUS FOR MAINTAINING A SCANNING OPTICAL PATH LENGTH WITHIN A PREDETERMINED RANGE

TECHNICAL FIELD

The present invention relates to a method and apparatus for scanning objects, and more particularly, to a method and apparatus which maintains an optical path length within a predetermined range when scanning objects at varying distances from a scanning system.

BACKGROUND OF THE INVENTION

A prior an scanning device 108, as shown in FIG. 1, is typically used to read symbology 110, such as a bar code, which consists of alternating areas ("bars") having different reflectance/absorption characteristics. The scanning device 108 receives the reflected light and interprets the fluctuations in radiant emittance caused by the reflectivity characteristics of the symbology 110. When the scanning device 108 is held in a stationary position, the object beating the bar code symbology 110 must be brought within the working range of the scanning device 108. This can be done with a conveyor belt 123. In "over-the-belt" scanning applications where objects 150 of different sizes travel underneath the scanning device 108, the distance from the scanning device 108 to an object 114 being scanned will change based on the size (height) of the object 114. When the optical path length 120 between the scanned object 114 and the scanning device 108 changes significantly, a number of problems will be encountered. The most obvious problem is loss of focus. This can be corrected with an automatic focusing mechanism built into a scanning lens system 112. The less obvious problem is that of changes in magnification. To compensate for such changes one must use a variable focus (zoom) system. The most practical and effective zoom system is based on changing the focal length of the scanning lens system 112. To achieve changes in focal length one or more lens groups must be moved within the scanning lens system 112.

Typically, zoom lens systems for industrial applications will be custom made when image quality and long life span are critical. This means that such variable focal length lenses are more expensive. Due to the need for the scanning lens system 112 to move lens group(s) for zooming and focusing, the optical performance of the system will be lower. Such zoom lenses typically have a lower modulation transfer function (MTF) than a fixed focal length lens, where MTF describes the modulation (contrast) of the image as a function of the spatial frequency of the object. Moving lenses will also place strict requirements on the actuators, which must move lenses with high precision very fast through millions of cycles. Any tilt or sideways shift introduced through the motion of the moved lenses will further degrade the image quality. Accordingly, "off-the-shelf," inexpensive lenses cannot be used in the scanning lens system 112 when the optical path length 120 significantly varies outside of the depth of field of the scanning lens system 112 while reading a sequence of symbologies 110 on different size objects 150. In the past, one was restricted to either using multiple scanners or lower performance but expensive custom lens systems.

SUMMARY OF THE INVENTION

It is an object of the present invention to eliminate the need both for focusing and a variable focal length lens to compensate for a change in the optical path length of a scanning system.

It is another object of the present invention to provide a method and apparatus for scanning that uses an optical system which is less expensive and more robust and durable in mechanical design by requiring fewer moving components and minimizing component travel.

It is still another object of the present invention to provide a method and apparatus for scanning that uses an optical system which requires less power by having moving components that are low in weight and fast in response time.

It is a further object of the present invention to provide a method and apparatus for scanning targets at variable distances from a scanner that uses an optical system having a fixed focal length lens that is inexpensive and easy to obtain and that can be purchased "off the shelf."

It is yet another object of the present invention to use components which will significantly increase the life of the scanning device.

In one aspect, the invention is a scanning apparatus for scanning different sized objects (i.e., different distances from the scanner). The apparatus comprises a reading device that reads or scans data on an object positioned on a reference surface and an optical system including a lens having a depth of field and a plurality of optical paths each having a unique object plane, wherein the object plane of each of the plurality of the optical paths is positioned at a different distance from a point on the reference surface, and wherein the object plane of each of the plurality of optical paths is separated from an adjacent object plane from one of the plurality of optical paths by a distance no greater than the depth of field of the lens. The apparatus also comprises a size or distance detector that determines the distance of the object from the point on the reference surface, and a selecting device that selects one of the plurality of optical paths with the object plane that has a distance from the point on the reference surface closest to the distance from the point of the object being scanned, whereby the object being scanned falls within the depth of field of the lens.

In another aspect, the invention is a scanning apparatus for scanning objects of different height. The apparatus comprises a reading device that reads data on an object being scanned, and an optical system having a plurality of optical paths between a reference position and the reading device, wherein each of the plurality of optical paths has a different optical path length to the reference position. The apparatus also comprises a size detector that determines a distance of the data on the object from the reference position and outputs a signal based on the distance of the data on the object from the reference position, and a selecting device that selects one of the plurality of optical paths of the optical system based on the single output by the size detector to maintain an optical path length between the object being scanned and the reading device that is within a predetermined range.

In another aspect, the invention is a method for scanning objects having different heights. The method comprises the steps of determining the size of an object being scanned, positioning a plurality of optical paths between the object being scanned and a reading device, selecting an optical path from one of the plurality of optical paths based on the size of the object being scanned, and reading data on the object being scanned with the reading device via the selected optical path.

In yet another aspect, the invention is a method of maintaining a constant optical path length range when scanning objects with a scanning device at different distances. The method includes the steps of receiving light from one of the objects being scanned with a redirecting mirror and redirecting the light to a plurality of mirrors, positioning the plurality of mirrors at different distances from the redirecting mirror, producing a plurality of optical paths with the plurality of mirrors, projecting each of the optical paths onto an image plane, wherein each of the optical paths has a different field of view, determining a height of the object being scanned, and selecting one of the fields of view based on the height of the object being scanned.

BRIEF DESCRIPTION OF THE DRAWINGS

FIG. 5A is a schematic diagram of a linear CCD used in the scanning system of FIG. 2.

FIG. 5B is a schematic diagram of an alternative embodiment of the selection device shown in FIG. 3.

FIG. 6 is a schematic diagram of a second embodiment of the scanning system of the present invention.

DETAILED DESCRIPTION OF THE INVENTION

Figure 1:
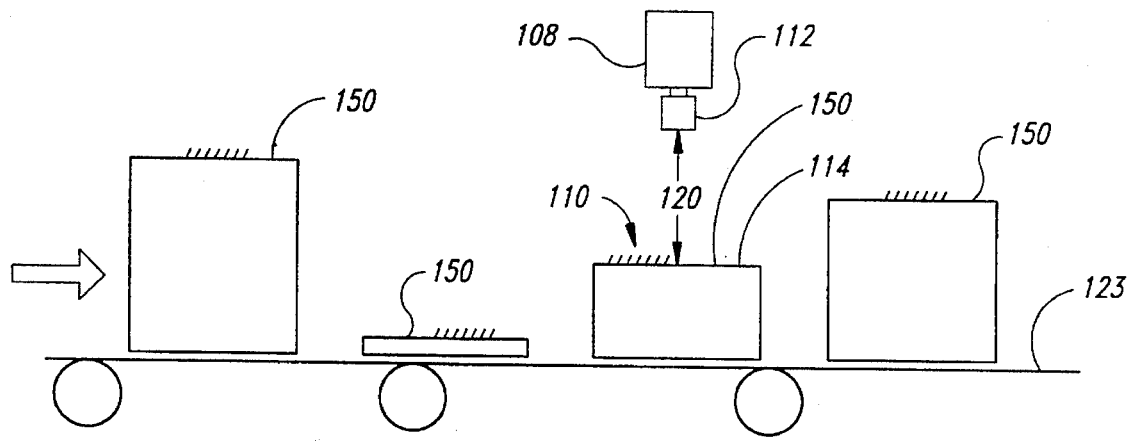
FIG. 1 is a schematic diagram of the prior art.
Figure 2:
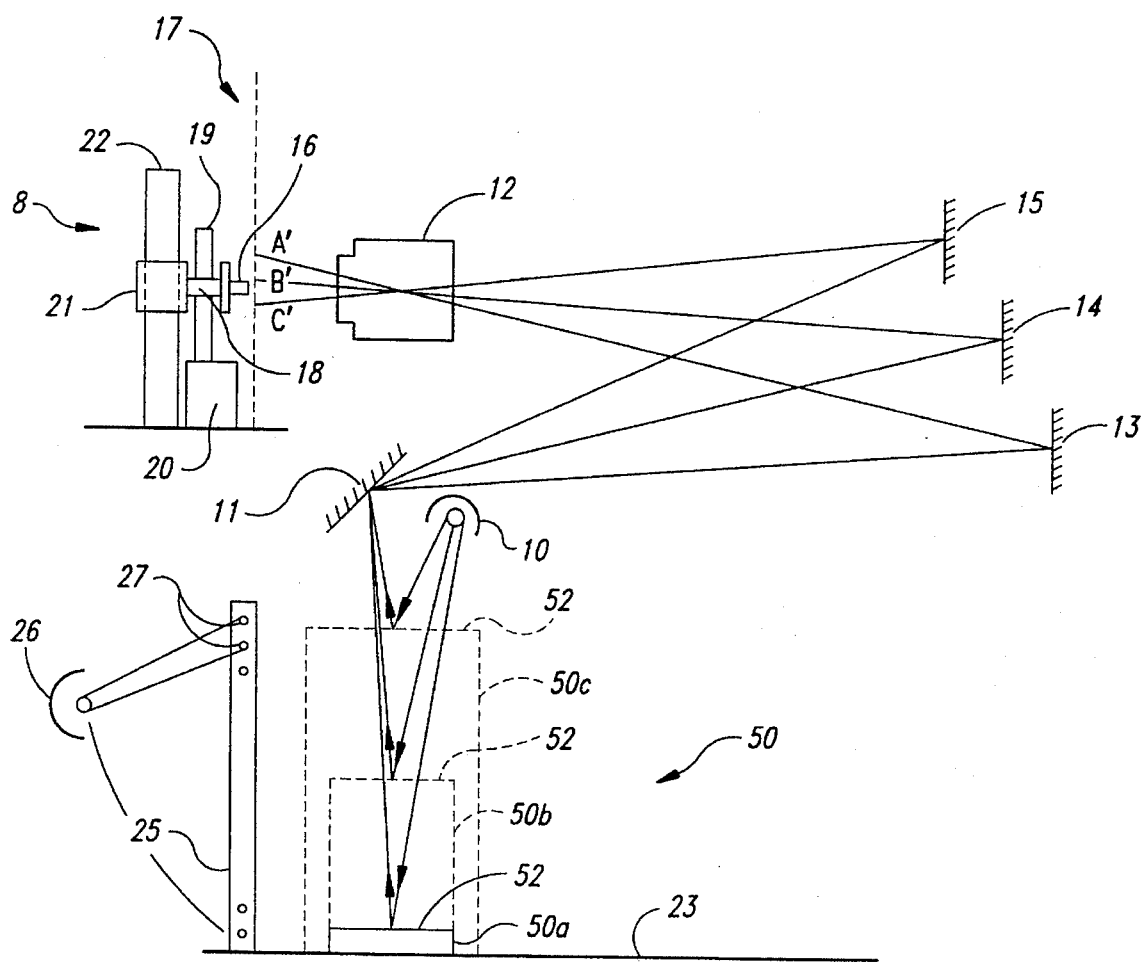
FIG. 2 is a schematic diagram of a first embodiment of the scanning system of the present invention.

A stationary scanning apparatus 8 according to the present invention is shown schematically in FIG. 2. The scanning apparatus 8 includes a light source 10, and an optical system having a redirecting mirror 11, a fixed focal length lens system 12, a first mirror 13, a second mirror 14, and a third mirror 15. The apparatus also uses a light sensing device such as a linear CCD imager 16 which is positioned in an image plane 17. The CCD imager 16, which is shown in FIG. 5A, is coupled to a traveling nut 18 which threadably engages a vertically oriented threaded shaft 19. The shaft 19 is rotationally driven by a motor 20. The nut 18 is also connected to a slider 21, which slides along a slider guide 22, causing the CCD imager 16 to traverse the image plane 17 when the motor 20 is driven.

Objects, such as boxes 50 having an upper surface 52 containing a bar code (not shown), are scanned as they move along on a conveyor belt 23 past the scanning apparatus 8. The boxes 50 being scanned may vary in size from some predetermined minimum accommodatible object size, shown by box 50a to some predetermined maximum accommodatible object size, shown by box 50c. An intermediate size box is shown as box 50b. The light source 10 is aligned to illuminate the upper surface 52 of each size box. The first mirror 13 lies along an optical path that is aligned with a scanning image on box 50c having the maximum accommodatible size, the third mirror 15 lies along an optical path that is aligned with a scanning image on box 50a having the minimum accommodatible object size, and the second mirror 14 lies along an optical path that is aligned with a scanning image on box 50b. Relative to some reference height, such as the conveyor belt, the difference between the length of the optical path containing the first mirror 13 and the length of the optical path containing the second mirror 14 is equal to the depth of field of the CCD imager 16 and the lens system 12. This is also true for the difference between the length of the optical path containing the second mirror 14 and the length of the optical path containing the third mirror 15. The depth of field of a CCD imager and a lens system can be calculated approximately by the equation:

$$DOF=2*f/\#*PP*M(M+1),$$

where f/# is the f-number of the lens system 12, PP is the pixel pitch for the CCD imager 16, and M is the object magnification of the optical system.

In the present embodiment there are three distinct optical paths upon which light reflected from the bar code may travel. First, the light may travel along the optical path containing the second mirror 14. When this path is used, the light reflected by the second mirror 14 travels along the optical axis of lens system 12. The light reflected from the bar code may also travel along either of the respective optical paths containing the first and third mirrors 13 and 15. These mirrors do not reflect the light directly along the optical axis of lens system 12 since they are positioned away from the optical axis of lens system 12. Here, the first mirror 13 is positioned below the optical axis and the third mirror 15 is positioned above the optical axis. By positioning the first and third mirrors 13 and 15 in this manner, the optical path of the light reflected from each mirror forms a unique predetermined angle with the optical axis of lens system 12. Further, the positioning of mirrors 13, 14, and 15 relative to the optical axis of lens system 12 causes the light traveling along the optical path of each mirror to fall on the same image plane 17 such that each of the optical paths has an independent field of view. The optical path corresponding to each of the mirrors 13, 14, and 15, can be individually selected for reception by powering the motor 20 to cause the CCD imager 16 to traverse the image plane 17 until a general position sensing device 24, such as an LVDT or linear decoder, determines that the CCD imager 16 is located at the position in the field of view that corresponds to the selected optical path.

Figure 3:
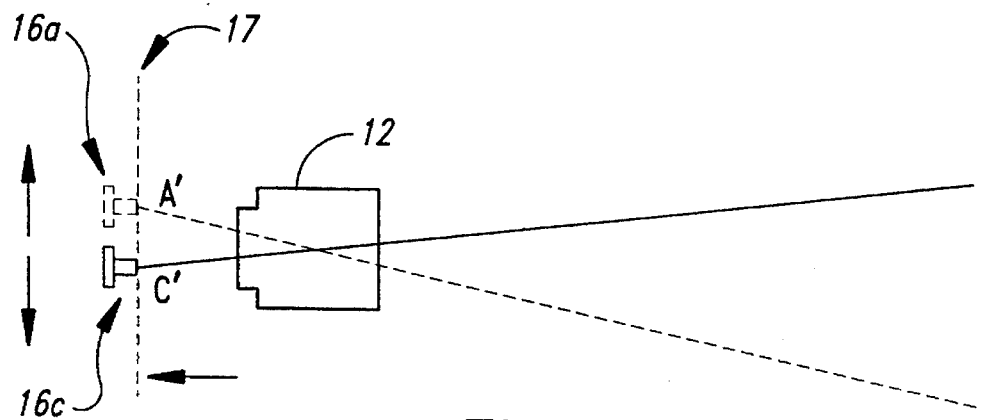
FIG. 3 is a schematic diagram of the lens and CCD imager of the scanning system of FIG. 2.

An enlarged view of the fixed lens of the lens system 12 and the CCD imager 16 used in the scanning apparatus 8 is shown in FIG. 3. FIG. 3 illustrates the CCD imager 16 selectively traversing the image plane 17 from a position 16c to a position 16a in a direction perpendicular to a scanning direction to change the selected field of view from the optical path corresponding to the third mirror 15 to the optical path corresponding to the first mirror 13. This movement of the CCD imager 16 is produced by selectively powering the motor 20 to move the nut 18 upward on the shaft 19 a predetermined distance with, for example, a step motor, or preferably until a general position sensing device 24 determines that the CCD imager 16 is positioned to the appropriate location within the field of view corresponding to the path of the first mirror 13.

Initially, as one of the boxes 50 moves along the conveyor belt 23, its height is determined by a height detector 25 shown in FIG. 2. A light emitter 26 emits light which is detected by at least one of a plurality of light sensors 27 of the height detector 25, as also shown in FIG. 2. A signal that is proportional to the height of the detected one of the boxes 50 is produced from the plurality of light sensors 27 of the height detector 25. Alternatively, the height detector 25 and the scanning apparatus 8 could be positioned in a manner (i.e., 90° from its depicted direction) to determine the width or size of the box 50.

Figure 4A:
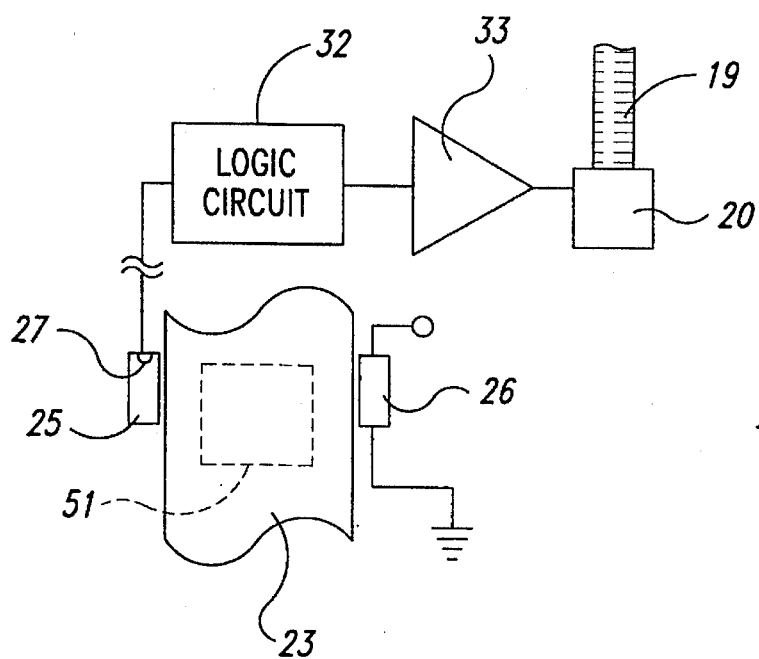
FIG. 4A is a schematic diagram of an optical path selection device used in the scanning system of FIG. 2.

The signal from the height detector 25 is processed by logic circuitry 32, shown in FIG. 4A, which selects one of the three optical paths containing either first mirror 13, second mirror 14, or third mirror 15. The logic circuitry by analyzing the signal from the height detector determines if the box 50 falls within one of three ranges, small, medium, and large. If the logic circuitry determines that box 50 falls within the small range (i.e., it is around the minimum accommodatible height of box 50a), then it sends a signal, which is conditioned by motor driving circuit 33, to drive motor 20 moving the CCD imager 16 along the image plane 17 to the field of view of the optical path containing the third mirror 15 with the aid of the position sensing device 24. By this same process, if the logic circuitry 32 determines that the box 50 falls within the medium range (i.e., around the height of box 50b), then it will select the optical path containing the second mirror 14, and if it determines that the box 50 falls within the large range (i.e., around the height of box 50c), then the logic circuitry 32 will select the optical path containing the first mirror 13. The logic circuitry 32, as stated above, selects an optical path by sending a signal to a motor driving circuit 33 which drives the motor 20. The motor 20 is driven in a designated rotational direction to cause the threaded shaft 19 to displace the CCD imager 16 in the image plane 17 in a direction perpendicular to the scan direction until the position sensing device 24 indicates that the CCD imager 16 is aligned with the field of view corresponding to the optical path of the mirror 13, 14, or 15 selected by the logic circuitry 32.

By selecting the optical path in the manner stated above, the total optical path length that the light reflected from the scanning image on the box must travel to reach the CCD imager 16 can be maintained within a certain predetermined range. This predetermined range is selected so that the total change in optical path length stays within the depth of field of the lens system 12 and the CCD imager 16, thereby eliminating the need to focus the lens system 12. The predetermined range is also selected so that the scanning apparatus 8 will stay within the amount of overscan that can be tolerated by the CCD imager 16.

As shown in FIG. 2, the distance that light must travel from the redirecting mirror 11 to the lens system 12 varies incrementally for each of the three optical paths which each contain one of the mirrors 13, 14, or 15. This incremental difference represents a range in which the overscan and the depth of field of the lens system 12 and the CCD imager 16 can be tolerated. An optical path is selected corresponding to a detected object height so that the distance from the scanning image on the object to the image plane 17 can be held within the range in which the lens system 12 and CCD imager 16 can operate without requiring the lens system 12 to change focal length or re-focus. In this manner, the scanning apparatus 8 compensates for different object heights in discrete steps, and the number of these discrete steps, or optical paths available to maintain the predetermined range between the CCD imager 16 and the scanning image, will depend on the number of mirrors used. The illustrated embodiment shows use of three mirrors 13, 14, and 15, but additional or fewer mirrors may be used to accommodate the number of object heights to be scanned as will be described below.

The number of optical path length compensating mirrors required by a scanning system depends primarily on the depth of field of the fixed lens system used as well as the overscan that can be tolerated. For example, if a 20 mil code is to be scanned over a box height range of 36 inches with an f/8 lens, a minimum of six optical path compensating mirrors would be required if the depth of field for such a system is approximately six inches. A scanning apparatus designed in this manner would have a minimum of overscan and thus would require less pixels for scanning labels at different distances, thereby allowing an increase in the speed of the conveyor belt 23.

Figure 4B:
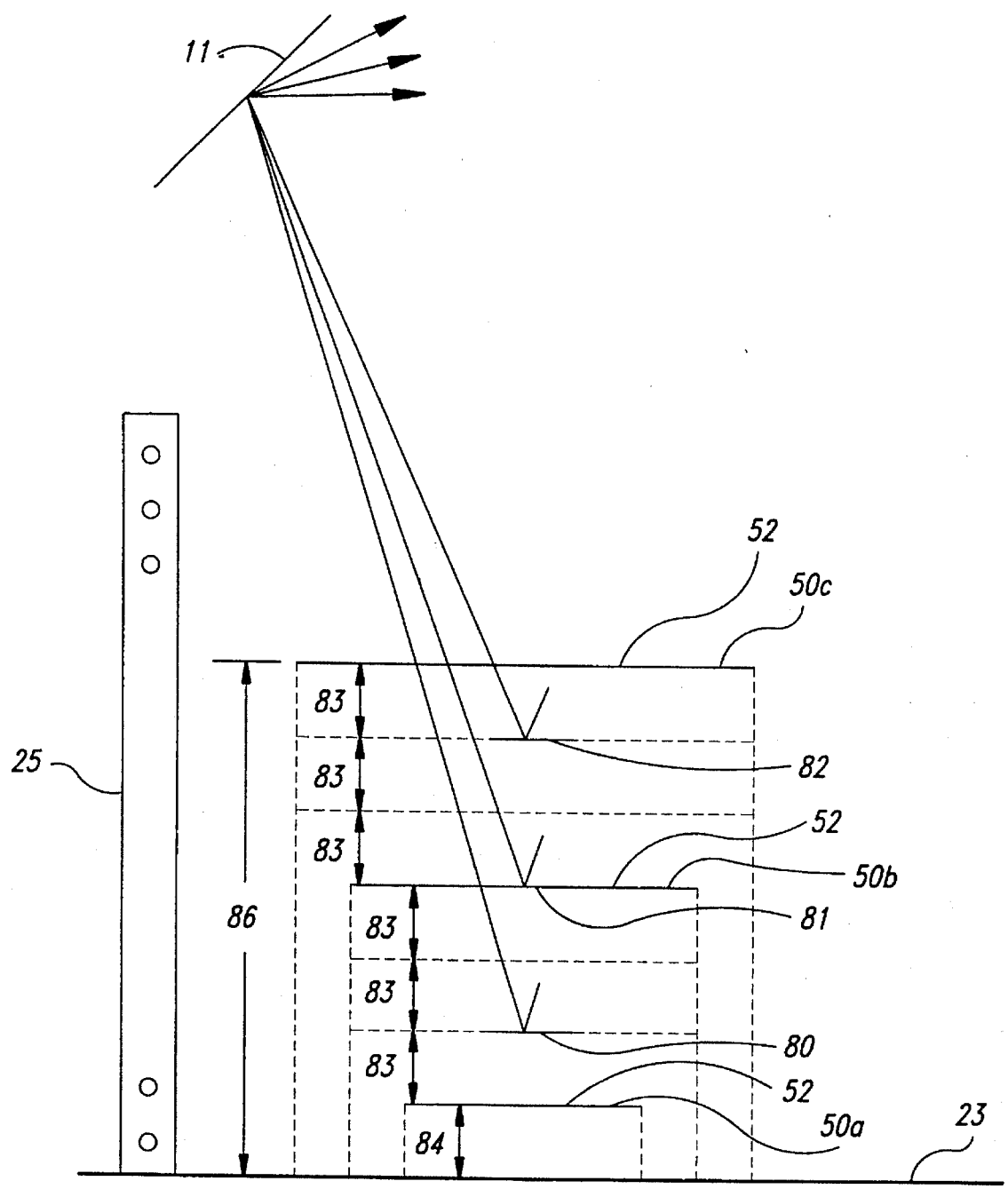
FIG. 4B is a schematic diagram of a preferred object plane placement of the optical paths of the scanning system of FIG. 2.

The number of mirrors, such as folding mirrors, necessary to provide an optical path length within the predetermined range for objects varying from the predetermined minimum accommodatible object size to the predetermined maximum accommodatible object size can be minimized. For example, if the optical system for the optical path of each of the mirrors 13, 14, and 15 has a respective object plane 80, 81, and 82 set to a different height above some reference, such as the conveyor belt, as shown in FIG. 4B, then every scannable box height must either lie on one of the object planes or within the depth of field above and below them. The optical path used to read the scanning image on an object having a height falling within the small range (i.e., around box height 50a) should have an object plane 80 that is above the conveyor belt 23, by an amount equal to the predetermined minimum accommodatible object size 84 plus half the depth of field 83 of both the lens system 12 and the CCD imager 16. Further, the optical path used to read the scanning image on an object falling within the large range (i.e., around box height 50c) should have an object plane 82 that is above the conveyor belt 23 by an amount equal to the maximum accommodatible object size 85 less half the depth of field 83 of the lens system 12 and the CCD imager 16, as shown in FIG. 4B. The optical path used to read objects falling within the medium range (i.e., around box height 50b) should have an object plane 81 located equidistant from the object planes 80 and 82. In an arrangement such as this, once the object height has been determined by the detector 25, the optical path having an object plane closest in height to the object is selected by the logic circuitry 32, shown in FIG. 4A.

FIG. 5A is a cross-sectional diagram of the linear CCD imager 16. An unused portion 61 and a used portion 62 of the CCD imager 16 are illustrated. The length of the used portion 62 of the CCD imager 16 is based on the minimum number of pixels necessary to scan the largest box size.

FIG. 5B is a schematic cross-sectional diagram of an alternative embodiment of the selection device of FIG. 4A. In this alternative embodiment, the CCD imager 16 is moved in a direction substantially perpendicular to the scan direction and substantially parallel to the image plane 17. The CCD imager 16 is coupled to a shaft 40 which pivots about a flexure 41 such as Lucas Aerospace's "FREE-FLEX" pivot. It is important that the shaft 40 be sufficiently long so that when it pivots about the flexure 41, the CCD imager 16 will travel substantially parallel to the image plane 17. The pivoting movement is caused by a driving force applied perpendicular to the shaft 40 by either a solenoid or a linear motor 42, which is controlled by the height detector 25, the position sensing device 24, and the logic circuitry 32, as previously described for the first embodiment and depicted in FIGS. 2 and 4A.

FIG. 6 is a cross-sectional schematic diagram of a second embodiment of the present invention. In this embodiment, many of the elements are common to the first embodiment, as depicted in FIGS. 2 and 4A. For example, objects of varying height are conveyed along a conveyor belt 23 and light traveling along a designated optical path is received by a CCD imager 16 after first passing through a lens system 12. However, in this embodiment, the CCD imager 16 is fixed at a position normal to the optical axis of the lens system 12, and the selection process is performed in object space instead of image space. Further, the light reflected from a bar code (not shown) is directly received by the first, second or third mirror 13, 14 or 15 depending on the height of the object. An optical path containing one of the mirrors 13, 14, or 15 is selected by a pivoting mirror 61, which is pivoted or rotated to reflect light from a selected field of view corresponding to the selected optical path along the optical axis of the lens system 12 and onto the CCD imager 16. The position of the pivoting mirror 61 is determined by signals from the height detector 25 and the position sensing device 24, as described for the first embodiment shown in FIGS. 2, 4A, and 4B. The actual pivoting of the pivoting mirror 61 can be performed by a mechanism similar to that used to pivot the CCD imager 16 in the alternative embodiment to the selection device shown in FIG. 5B. However, in this embodiment, the length of the shaft 40 should be nominal to ensure that the surface 63 of the pivoting mirror 61 is capable of changing its angle with respect to each of the mirrors 13, 14, and 15.

Figure 7:
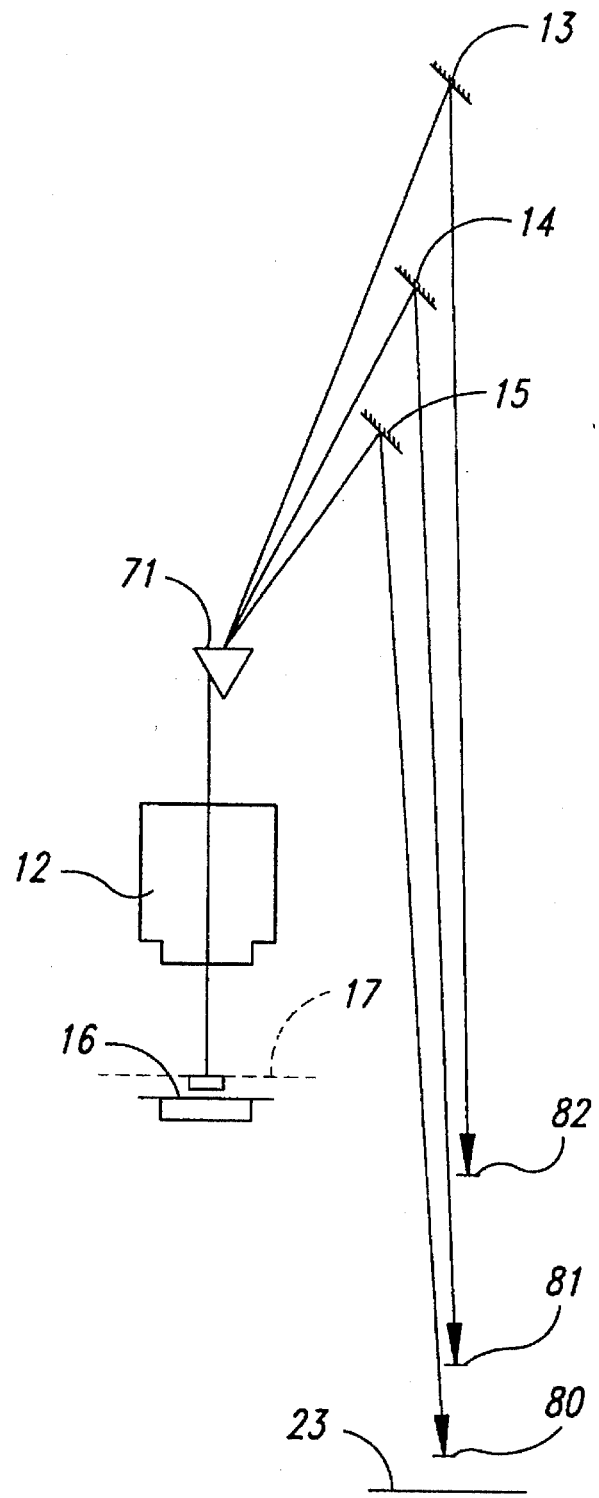
FIG. 7 is a schematic diagram of a third embodiment of the scanning system of the present invention.

FIG. 7 is a cross-sectional schematic diagram of a third embodiment of the present invention. This embodiment is similar to the embodiment in FIG. 6 except that the selection of the optical path corresponding to either mirrors 13, 14 or 15 is determined by a rotating diffractive or a refractive element 71. These elements can be wavelength dependent and can be produced by a holographic process.

In the third embodiment shown in FIG. 7, the rotating element 71 selects an optical path corresponding to one of the mirrors by rotating so that only a field of view that corresponds to the selected path will be refracted onto the CCD imager 16. The diffractive or refractive element 71 is rotated so that it will direct only one of the optical paths from the first, second or third mirror 13, 14 or 15 through the lens system 12 and onto the CCD imager 16. As in the previous embodiments, an optical path corresponding to one of the mirrors is selected for a range of object distances so that the total optical path length from the CCD imager 16 to the object being scanned remains within a constant range.

Figure 8:
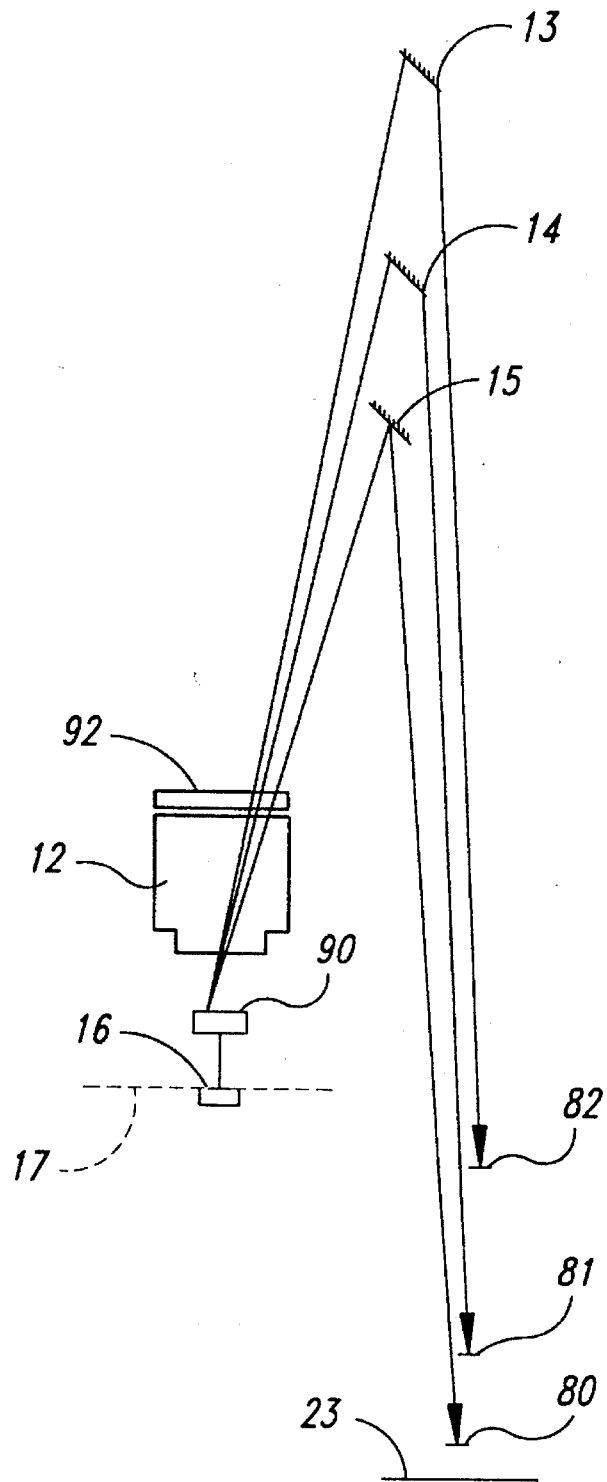
FIG. 8 is a schematic diagram of a fourth embodiment of the scanning system of the present invention.

FIG. 8 is a cross-sectional schematic diagram of a fourth embodiment of the present invention. In this embodiment, many of the elements are common to the third embodiment shown in FIG. 7. For example, objects of varying distance from a CCD imager 16 are scanned, and light traveling along a designated optical path is received by the CCD imager 16 after first passing through a lens system 12. In this embodiment, the CCD imager 16 is fixed at a position normal to the optical axis of the lens system 12. Further, the light reflected from the bar code (not shown) is directly received by the first, second, or third mirror 13, 14, or 15 depending on the height of the object. An optical path containing one of the mirrors 13, 14, or 15 is selected by an acousto-optic modulator 90, which is positioned in the image plane between the lens system 12 and the CCD imager 16. The acousto-optic modulator 90 uses a low voltage RF signal to launch an acoustic wave into a block of fused silica, where the wave sets up a sinusoidal refractive index grating which scatters the incident beams out of their original direction with good efficiency. The switching speed of the modulator 90 is usually no more than a few microseconds allowing it to be highly responsive to a signal from the height detector 25, which selects the optical path that will provide a predetermined range of distances between the CCD imager 16 and the object being scanned. Since the acousto-optic modulator 90 is designed to switch monochromatic light, a monochromatic filter 92 is mounted onto the object side of the lens system 12.

By maintaining a constant optical path length range from an object to the CCD imager 16, the previously discussed embodiments allow a scanning optical apparatus to incorporate a fixed focus non-zoom lens within the scanning system, thereby creating a more reliable, less expensive and longer lasting lens system within the optical scanning apparatus.

Except as otherwise disclosed herein, the various components shown in outline or block form are individually well-known and their internal construction and their operation is not critical either to the making or the using of this invention or to a description of the best mode of the invention.

While the detailed description above has been expressed in terms of specific examples, those skilled in the art will appreciate that many other configurations could be used to accomplish the purpose of the disclosed inventive apparatus. Accordingly, it will be appreciated that various modifications of the above-described embodiments may be made without departing from the spirit and scope of the invention. Therefore, the invention is to be limited only by the following claims.

I claim:

1. An optical apparatus for reading data present on different size objects, said apparatus comprising:

a reading device that reads only a single image of the data on an object positioned on a reference surface;

an optical system including a lens having a depth of field and a plurality of optical paths each having a unique object plane, wherein the object plane of each of the plurality of optical paths is positioned at a different distance from a point on the reference surface and wherein the object plane of each of the plurality of optical paths is separated from an adjacent object plane of one of the plurality of optical paths by a distance no greater than the depth of field of the lens;

a size detector that determines the distance of the object from the point on the reference surface; and a selecting device that selects only one of the plurality of optical paths with the object plane that has a distance from the point on the reference surface closest to the distance from the point of the object, and wherein the object falls within the depth of field of the lens and the reading device substantially simultaneously receives the single image of the data.

2. The optical apparatus according to claim 1 wherein said optical system further comprises:

a redirecting element that redirects light from the object; and a plurality of optical elements, each of which redirects light from said redirecting element along a distinct field of view of the lens, each of the plurality of optical elements being positioned a predetermined distance from said redirecting element, and each of the plurality of optical elements corresponding to one of the plurality of optical paths.

3. The optical apparatus according to claim 2 wherein said selecting device comprises:

a selector that selects the one of the plurality of optical paths; and driving device that moves said reading device along an image plane of the lens to the distinct field of view corresponding to the one of the plurality of optical paths that is selected.

4. An optical apparatus for reading data present on objects of different height, said apparatus comprising:

a reading device that reads only a single image of the data on an object;

an optical system having a plurality of optical paths between a reference position and said reading device, wherein each of the plurality of optical paths has a different optical path length to the reference position;

a size detector that determines a distance of the data on the object from the reference position and produces a signal based on the distance of the data on the object from the reference position; and a selecting device that selects only one of the plurality of optical paths of said optical system based on the signal produced by said size detector to substantially simultaneously provide to the reading device the single image of the data and to maintain an optical path length between the object and said reading device that is within a predetermined range.

5. The optical apparatus according to claim 4 wherein said optical system further comprises:

a redirecting mirror that redirects light from the object;

a plurality of mirrors, each of which is positioned a predetermined distance from said redirecting mirror, and each of which redirects light from said redirecting mirror causing the light from each of said plurality of mirrors to travel along one of the plurality of optical paths; and a lens that receives the light traveling along each of the plurality of optical paths from said plurality of mirrors and projects the light from each of the plurality of optical paths at different positions along an image plane.

6. The optical apparatus according to claim 5 wherein said selecting device comprises:

an electronic selector that selects the one of the plurality of optical paths that will maintain the optical path length within the predetermined range based on the signal produced by said size detector, and produces a driving signal; and a driving device that moves the reading device along the image plane to a selected position in response to the driving signal.

7. The optical apparatus according to claim 6 wherein said driving device further comprises:

a nut coupled to said reading device for movement therewith;

a threaded shaft engaged with said nut;

a slider coupled to said nut;

a slider guide and base assembly, said slider guide slidingly engaged with said slider; and a motor rotatingly coupled to said threaded shaft, said motor in conjunction with slider guide moving the reading device to the selected position in response to the driving signal.

8. The optical apparatus according to claim 6 wherein said driving device comprises:

a shaft coupled to said reading device;

a flexure upon which said shaft pivots; and a solenoid that causes said shaft to pivot about said flexure to move said reading device to the selected position in response to the driving signal and a position sensor.

9. The optical apparatus according to claim 5 wherein said reading device comprises a CCD imager.

10. The optical apparatus according to claim 5 wherein said lens comprises a fixed focal length lens.

11. The optical apparatus according to claim 9 for use with a conveyor with a surface on which the object is transported wherein the reference position is located at about the conveyor surface.

12. The optical apparatus according to claim 11 wherein an object plane of one of the plurality of optical paths having the least height above the conveyor surface is set above the conveyor surface by a minimum object height plus one-half the depth of field of said reading device and lens.

13. The optical apparatus according to claim 12 wherein the depth of field for said reading device and lens is approximately determined by the f-stop of the lens, the pixel pitch of the CCD imager and the object magnification of the lens.

14. The optical apparatus according to claim 13 wherein an object plane of one of the plurality of optical paths having the greatest height above the conveyor surface is set above the conveyor surface by a maximum object height less one-half the depth of field of said reading device and lens.

15. The optical apparatus according to claim 14 wherein the amount of said plurality of mirrors is at least equal to the maximum object height less the minimum object height divided by the depth of field of said reading device and lens.

16. The optical apparatus according to claim 4 for use with a conveyor with a surface on which the object is transported wherein the reference position is located at about the conveyor surface.

17. The optical apparatus according to claim 4 wherein said optical system further comprises:

a plurality of mirrors, each associated with one of the plurality of optical paths, each of said mirrors being positioned a predetermined distance from each other of said plurality of mirrors such that the optical path length associated with each of said plurality of mirrors differs from the others of said plurality of mirrors; and a lens which projects light onto the reading device.

18. The optical apparatus according to claim 17 wherein said selecting device controls an acousto-optic modulator that selects one of said plurality of optical paths by redirecting light from one of the plurality of mirrors to said reading device.

19. The optical apparatus according to claim 17 wherein said lens comprises a fixed focal length lens.

20. The optical apparatus according to claim 17 wherein said selecting device controls a selecting member that selects the one of said plurality of optical paths by redirecting light from one of said plurality of mirrors to said lens.

21. The optical apparatus according to claim 20 wherein said selecting member further comprises a reflecting surface which is rotatable to redirect the light from the one of said plurality of mirrors to said lens.

22. The optical apparatus according to claim 20 wherein said selecting member further comprises a reflecting surface which is translated to redirect the light from the one of said plurality of mirrors to said lens.

23. The optical apparatus according to claim 20 wherein said selecting member further comprises a refractive element which is rotated to redirect the light from the one of said plurality of mirrors to said lens.

24. The optical apparatus according to claim 20 wherein said selecting member further comprises a diffractive element which is rotated to redirect the light from the one of said plurality of mirrors to said lens.

25. The optical apparatus according to claim 20 wherein said selecting member further comprises a diffractive element which is translated to redirect the light from the one of said plurality of mirrors to said lens.

26. A method for reading data on objects having different sizes, said method comprising the steps of:

determining the size of an object with data to be read;

positioning a plurality of optical paths between the object and a reading device; selecting only a single optical path from one of the plurality of optical paths based on the size of the object, and reading only a single image of the data on the object via the selected optical path.

27. The method of reading data according to claim 26 wherein each of the optical paths has a different length.

28. A method of maintaining a constant optical path length range when scanning objects with a data reading device at varying distances, said method comprising the steps of:

receiving light from one of the objects with a redirecting mirror;

redirecting the light from the redirecting mirror to a plurality of mirrors;

positioning the plurality of mirrors at different distances from the redirecting mirror;

producing a plurality of optical paths with the plurality of mirrors;

projecting each of the optical paths onto an image plane with each of the optical paths having a different field of view;

determining a height of the object being read; and selecting only one of one of the fields of view based on the height of the object being read.

29. The method according to claim 28, wherein the step of selecting one of the fields of view includes the step of:

moving the data reading device to a position on the image plane to acquire the field of view that will maintain the constant optical path length range.

\* \* \* \* \*